United States Patent
Carrig et al.

[11] Patent Number: 6,105,921
[45] Date of Patent: Aug. 22, 2000

[54] ADJUSTABLE SEAT MOUNTING MECHANISM

[75] Inventors: John Francis Carrig, Heidelberg; Matthew Alan Cope, Somerville; Morris Taylor Murray, Briar Hill; Mark Paul Spataro, Avondale Heights; Martin Raymond Young, Ocean Grove, all of Australia

[73] Assignee: Henderson's Industries Pty. Ltd., Victoria, Australia

[21] Appl. No.: 08/983,234

[22] PCT Filed: Jul. 2, 1996

[86] PCT No.: PCT/AU96/00410

§ 371 Date: Mar. 3, 1998

§ 102(e) Date: Mar. 3, 1998

[87] PCT Pub. No.: WO97/02153

PCT Pub. Date: Jan. 23, 1997

[30] Foreign Application Priority Data

Jul. 4, 1995 [AU] Australia ................................ PN 3951

[51] Int. Cl.[7] .................................................. F16M 13/00
[52] U.S. Cl. .............................................................. 248/429
[58] Field of Search ..................................... 248/429, 430; 296/65.13, 65.14; 297/344.1

[56] References Cited

U.S. PATENT DOCUMENTS

| | | | |
|---|---|---|---|
| 1,891,457 | 12/1932 | Stannard ................................. | 248/429 |
| 2,126,143 | 8/1938 | Saunders et al. ...................... | 248/429 |
| 3,507,472 | 4/1970 | Agee et al. .............................. | 248/429 |
| 4,168,051 | 9/1979 | Terada ..................................... | 248/429 |
| 4,629,254 | 12/1986 | Stolper et al. .......................... | 297/473 |
| 4,730,804 | 3/1988 | Higuchi et al. ......................... | 248/429 |
| 4,958,799 | 9/1990 | Clauw et al. ........................... | 248/430 |
| 5,167,393 | 12/1992 | Hayakawa et al. ..................... | 248/430 |
| 5,213,300 | 5/1993 | Rees ........................................ | 248/429 |
| 5,301,914 | 4/1994 | Yoshida et al. ........................ | 248/430 |

FOREIGN PATENT DOCUMENTS

| | | |
|---|---|---|
| 0708717 | 5/1996 | European Pat. Off. . |
| 3127892 | 6/1983 | Germany . |
| 51-112022 | 10/1976 | Japan . |
| 41-51337 | 5/1992 | Japan . |
| 41-63236 | 6/1992 | Japan . |
| 2201451 | 9/1988 | United Kingdom . |

*Primary Examiner*—Ramon O. Ramirez
*Attorney, Agent, or Firm*—Birch, Stewart, Kolasch & Birch, LLP

[57] ABSTRACT

A seat mounting mechanism for mounting a seat for adjustable fore and aft movement, the mechanism having an elongate fixed rail which is adapted to be securable to a substructure, pan or floor, a movable rail which is engageable with the fixed rail and adapted to be securable to a seat, and at least one locking member mounted on a first one of the fixed rail and the movable rails. The locking member is pivotable between an engagement position in which it locks the movable rail relative to the fixed rail and a retracted position in which it frees the movable rail for adjustment along the fixed rail. The locking member is mounted on the first rail for pivotable movement, between the engagement and retracted positions, about a pivot axis extending substantially parallel to the rails. The locking member has an engagement mechanism by which it is selectively engageable with an engagement mechanism of, and disposed along, a second one of the rails when the locking member is in its engagement position. The engagement mechanism of the locking member is laterally engageable with the engagement mechanism of the second rail.

31 Claims, 5 Drawing Sheets

ADJUSTABLE SEAT MOUNTING MECHANISM

This application is the national phase under 35 U.S.C. §371 of prior PCT International Application No. PCT/AU 96/00410 which has an International filing date of Jul. 2, 1996 which designated the United States of America, the entire contents of which are hereby incorporated by reference.

BACKGROUND OF THE INVENTION

1. Field of the Invention

The present invention relates to an improved adjustable mechanism for mounting a seat for fore and aft movement. The invention has particular application in the mounting of motor vehicle seats although, while generally described in relation to that application, it is to be understood that the mechanism also can be used for mounting other types of seats.

2. Description of Related Art

An existing and well known type of adjustable, vehicle seat mounting mechanism has a fixed rail and a movable rail which is engaged with the fixed rail for movement therealong. The mechanism also includes a locking member which is mounted on one of the rails and which is pivotable between an engagement position in which it locks the movable rail relative to the fixed rail by projecting, usually laterally, through at least one pair of aligned apertures of the two rails, and a retracted position in which it frees the movable rail for adjustment along the fixed rail. As installed in a vehicle, the fixed rail of each of two laterally spaced mechanisms is secured to the substructure, pan or floor of the vehicle, with each movable rail secured to the underside of a seat of the vehicle. The locking members of the two mechanisms are inter-connected so as to be pivotable in unison, such as under the action of a release bar associated with one of the mechanisms.

While there are many forms of vehicle seat mounting mechanisms of that general type, examples are shown by U.S. Pat. Nos. 4,168,051 to Terada, 4,629,254 to Stolper et al and 4,958,799 to Clauw et al. Each of these patents illustrate a usual characteristic of known forms of mechanisms; namely, that they are formed from a metal plate, typically of steel, by roll forming, pressing and/or stamping. A further usual characteristic is that the rails are inter-engaged by a channel form of one receiving a channel form of the other. Often the channel form of the movable rail is simply slidable in or on the fixed rail, although U.S. Pat. No. 4,958,799 (Clauw et al) shows an arrangement in which bearing means are provided between the rails. A departure from the usual characteristic of rails formed from a metal plate is shown by International patent specification WO95/02520 (Clausen/Norsk Hydro A.S.). in which the rails are extruded, such as from an aluminium alloy.

There are design constraints on mechanisms having components conventionally formed from a metal plate. There is also difficulty in achieving a suitable balance between weight and strength. Vehicle manufacturers seek to minimise the weight of all vehicle components. However, the sectional thicknesses of the metal plate for the mechanisms can only be reduced to a certain limit. Therefore, there is a limit to which the weight can be reduced if strength is not to be compromised. Of course, a countervailing pressure for vehicle manufacturers is safety, and strength can not be adversely compromised if safety standards are to be satisfied. The proposal of WO95/02520 offers the possibility of weight saving, by utilising the more favorable weight to strength ratio of aluminium alloys. However, while extrusion of rails of an aluminium alloy obviates some of the design limitations inherent in processes for forming mechanisms from a metal plate, it introduces other limitations.

SUMMARY OF THE INVENTION

The present invention is directed to providing an improved adjustable seat mounting mechanism which enables use of materials of construction providing a more favorable weight to strength ratio. These include light metals, such as alloys of aluminium, zinc and magnesium, of which magnesium alloys are particularly preferred. However, the invention also enables use of suitable metal matrix composite materials, metal components made by powder metallurgy processes and engineering plastics materials.

The mechanism of the present invention has an elongate fixed rail which is adapted to be secured to a substructure, pan or floor of a vehicle (or to another substructure in the case of a non-vehicular application), an elongate movable rail which is engaged with the fixed rail and is adapted to be secured to the underside of a seat, and at least one locking member mounted on one of the rails and pivotable between an engagement position in which it locks the movable rail relative to the fixed rail and a retracted position in which it frees the movable rail for adjustment along the fixed rail.

The mechanism of the invention is intended to be used so as to provide a mounting for a seat along one side of the latter, to enable adjustment of the position of the seat in the direction of the rails. A similar mechanism is used to provide a mounting for the seat along its other side with the rails of each mechanism substantially parallel. An actuator may provide for common pivoting of the locking member of each mechanism to its retracted position. Alternatively, the actuator may act to pivot the locking member of one mechanism, with this pivoting causing simultaneous pivoting of the locking member of the other mechanism.

The fixed and movable rails of the mechanism of the present invention may be cast from a suitable light metal. The casting process may be gravity casting, pressure casting such as pressure diecasting, or squeeze casting or squeeze forming. Alternatively, the rails may be made of an engineering plastics material by a suitable molding process, such as injection moulding. With use of either metal or plastics material, casting or molding provides substantial freedom of design in the form of the rails, the arrangement by which the movable rail can be adapted for engagement with the fixed rails, and in the form of the locking member and its engagement with the rails.

The fixed rail may be of unitary construction. Alternatively, it may be of multi-part construction, comprising separately formed elongate components which are secured together. In the latter case, the components may interfit longitudinally, such as by frictional engagement therebetween, for example by means of a longitudinal tongue of one component being received within a groove defined by the other component. Securement of the components may be by means of bonding therebetween, such as where they interfit, by retention clips, by screw-threaded fasteners or, when appropriate for the material of construction, by welding. However, the movable rail preferably is of unitary construction.

The fixed rail may define an upwardly facing, longitudinal bearing surface on which the movable rail is supported. The movable rail may define a downwardly facing, longitudinal bearing surface by which it is supported on the fixed rail for movement therealong. The fixed and movable rails may be in direct, sliding contact at the respective bearing surfaces where they are formed of a plastics material having low friction characteristics, or where a lubricant is provided between the bearing surfaces. Alternatively, the fixed and movable rails may be in indirect contact at the respective bearing surfaces, by provision of bearing means, such as roller bearings, slippers or the like therebetween. However, in a highly preferred form of the invention, the movable rail is an upper rail which is supported on the lower rail, in contrast to the usual prior art arrangement in which the rails are laterally adjacent.

In one particularly suitable arrangement, each rail has two longitudinal bearing surfaces which are mutually inclined to enhance self-alignment during longitudinal movement of the movable rail on the fixed rail. In one form of that arrangement, the fixed rail has an upwardly facing, longitudinal surface which has the form of a V-section trough, each side of which defines one of two mutually inclined bearing surfaces, with the movable rail having a downwardly facing, longitudinal surface of complementary form, defining two mutually inclined bearing surfaces. In another form of the arrangement, the surfaces are of a converse form, in that the downwardly facing surface of the movable rail has the form of a V-section trough. With each form, a respective roller means or slipper may be provided between each of opposed pairs of bearing surfaces.

At least where the rails have such a self-aligning arrangement, they may be held in engagement by engagement between their bearing surfaces and by the locking member. Thus, the locking member may be a principal means preventing the movable rail from lifting from the fixed rail. However, there may be other means to prevent such lifting. In preferred forms, the mechanism of the present invention has further engagement between the rails which constrains the movable rail from lifting from the fixed rail. In one convenient arrangement, the fixed rail has a side wall along at least one side of the movable rail, and a laterally extending, longitudinal rib on either the side wall or the movable rail is located in a laterally open, longitudinally extending slot in the other one of the movable rail and the side wall. In general, it is preferred that the rib is on the side wall of the fixed rail, with the groove defined by the movable rail. However, the converse is possible.

The locking member may be made of a suitable metal, and it may be cast of the same or a different material to that used for the rails. Alternatively, the locking member may be made of an engineering plastics material. The method of forming may be as described in relation to the rails. That is the locking member may be die cast, produced by squeeze casting or forming, cast in sand molds or by investment casting, or it may be injection molded, depending on the material of which it is formed.

The locking member may be of unitary construction. Alternatively, it may be formed from two or more separately formed components which are secured together. In the latter case, securement can be as described with reference to the fixed rail. However, where of more than two components, the locking member is amenable to this necessitating only two component forms, distinguished for ease of reference as an end part and an intermediate part. In the latter case, the locking member may comprise two end parts which are assembled together, either directly or with at least one intermediate part therebetween.

The locking member is pivotably mounted on either the fixed rail or the movable rail, so as to be reversibly pivotable, preferably about a longitudinal axis substantially parallel to the rails. In either case, the locking member is adapted for pivotal movement on that one rail between its engagement and retracted positions. The locking member preferably is biased to the engagement position by a resilient biasing means, such as a helical, torsion or leaf spring, and pivotable to its retracted position against the action of the biasing means.

The locking member is adapted for locking engagement, when in its engagement position, with the other one of the rails; that is, with the rail on which it is not pivotably mounted. This engagement with the other rail is possible with the movable rail in any of a plurality of positions to which that rail is movable along the fixed rail. The engagement is by either of two converse arrangements. In the first of these, each of selected lateral projections of a plurality of longitudinally spaced projections of the other rail, is receivable in respective laterally open grooves, recesses or the like of the locking member. In the second of those arrangements, the laterally open grooves, recesses or the like are provided on the other rail and each receives a respective lateral projection of the locking member.

In some known mechanisms, engagement generally is by each of laterally projecting fingers of a locking member engaging in aligned apertures of each rail. This form of simultaneous engagement with each rail is not necessary in the mechanism of the present invention. However, it is desirable in the mechanism of the present invention that the locking member be separately engageable with each rail by means of lateral projections received in laterally open grooves, recesses or the like, as this is found to enhance the locking action of the locking member. Where the locking member is so simultaneously engageable, this can be in an integrated form in that the locking member may have grooves, recesses or the like with each of these receiving a respective projection of each rail, or the locking member may have projections each receivable in a groove, recess or the like of each rail. Alternatively, the locking member may have projections receivable in grooves, recesses or the like of one rail, and also have grooves, recesses or the like in which are receivable projections of the other rail.

The locking member may extend from its pivot axis across one side of the rails, then laterally with respect to the rails and have an end portion thereof which extends across to the other side of at least one of the rails. Where this is the case, the locking member may, for example, be at least partly of arcuate form transversely of its pivot axis and the rails. The arrangement may be such that the locking member is biased to its engagement position to achieve engagement with the other rail, that is the rail on which it is not pivotably mounted, at the one side of the rails. Where so biased, the end portion may define an abutment surface which engages at least one of the rails, at the other side, so as to limit pivoting of the locking member from its engagement position and thereby determine the retracted position.

For the purpose of describing arrangements in which the locking member can be pivotably mounted, it is convenient to do so in the context of the movable rail being an upper rail supported on the fixed rail, with the locking member disposed to one side of each rail. In a first arrangement applicable to that context, the locking member is mounted at an upper extent thereof on the movable rail, so as to be pivotable on an axis parallel with that rail. The locking member depends from the pivot axis, below a region along which the movable rail is supported on the fixed rail to a region at which the locking member when in its engagement position is selectively engaged with the fixed rail. When in that position, the locking member engages the fixed rail so as to prevent movement of the movable rail therealong. The arrangement preferably is such that the locking member is pivotable towards and away from the fixed rail in movement respectively to its engagement and retracted positions, with its engagement with the fixed rail separate from its mounting on, or other engagement with, the movable rail.

A second arrangement applicable to the above context is the converse of the first arrangement. That is, the locking member is mounted at a lower extent thereof on the fixed rail, and extends upwardly from a pivot axis parallel to that rail, above a region along which the movable rail is supported on the fixed rail, to a region at which the locking member when in its engagement position is selectively engaged with the movable rail.

In a highly desirable form of the first and second arrangements, the locking member not only is able to lock the rails, but also acts to hold the movable rail down onto the fixed rail. In the first arrangement, this can be by an upwardly facing surface defined by the locking member being able to bear against a downwardly facing surface of the fixed rail when the locking member is in its engagement position. In the second arrangement, a downwardly facing surface defined by the locking member can bear against an upwardly facing surface of the movable rail.

In the first and second arrangements, the locking member can be pivotably mounted so as to laterally engage the fixed or movable rail, respectively, by pivoting towards the same side of each rail. For this, the locking member may be pivotably mounted on the same side of the movable or fixed rail as the side of the fixed or movable rail, respectively, it is to engage. However, other mounting arrangements are possible. Thus, the locking member may have at least one arm which projects through an opening of the rail on which the locking member is pivotably mounted. With the mounting being at a side of that rail which is opposite to the side of the other rail with which the locking member is to be selectively engageable. Preferably the locking member has at least two such arms, each of which projects through a respective opening of the rail on which the locking member is mounted.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In order that the invention may be understood in further detail, description now is directed to the accompanying drawings, in which.

DESCRIPTION OF THE PREFERRED EMBODIMENTS

Figure 1:
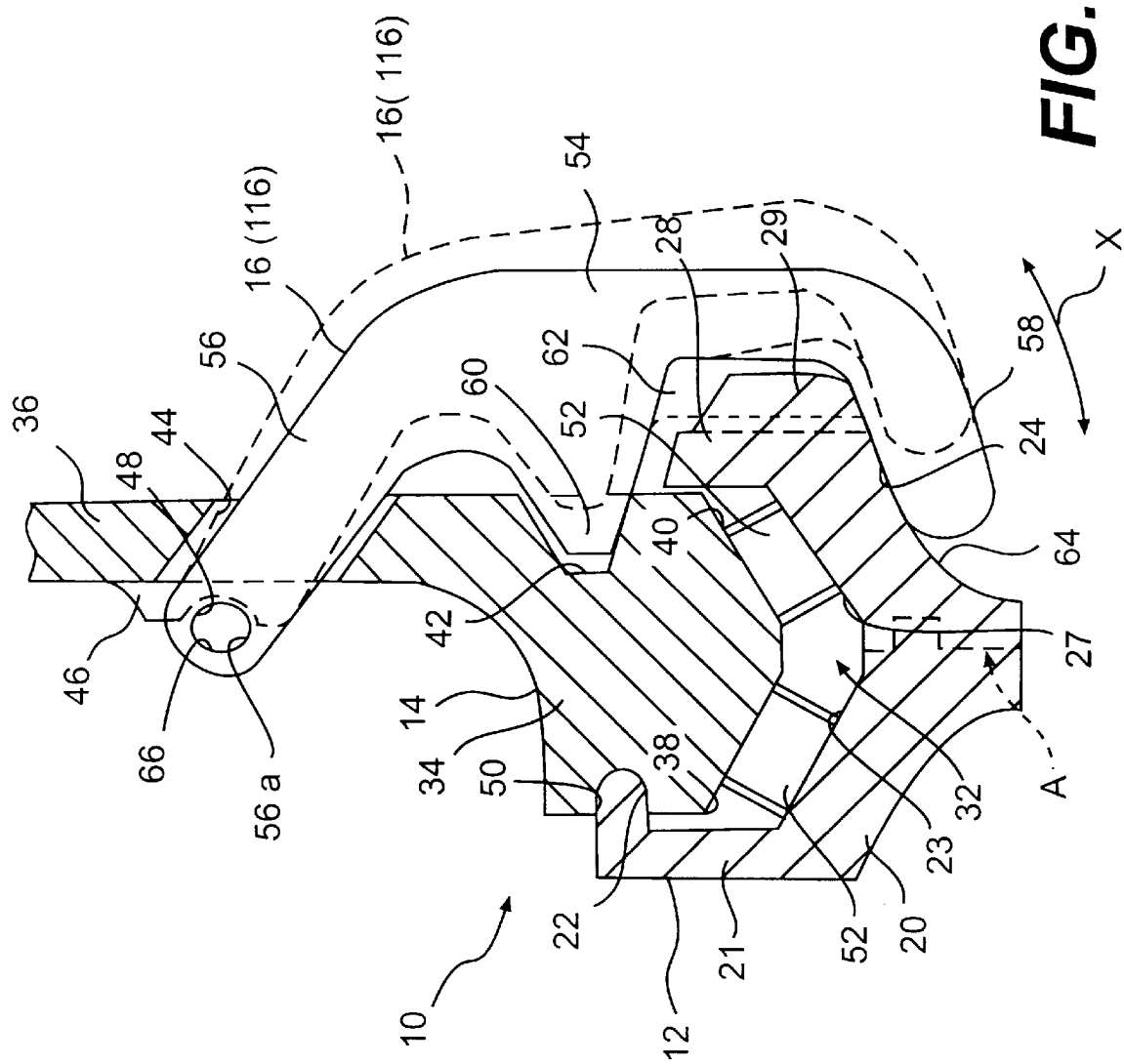
FIG. 1 is a partial transverse section through a first form of adjustable seat mounting mechanism according to the present invention.
Figure 2:
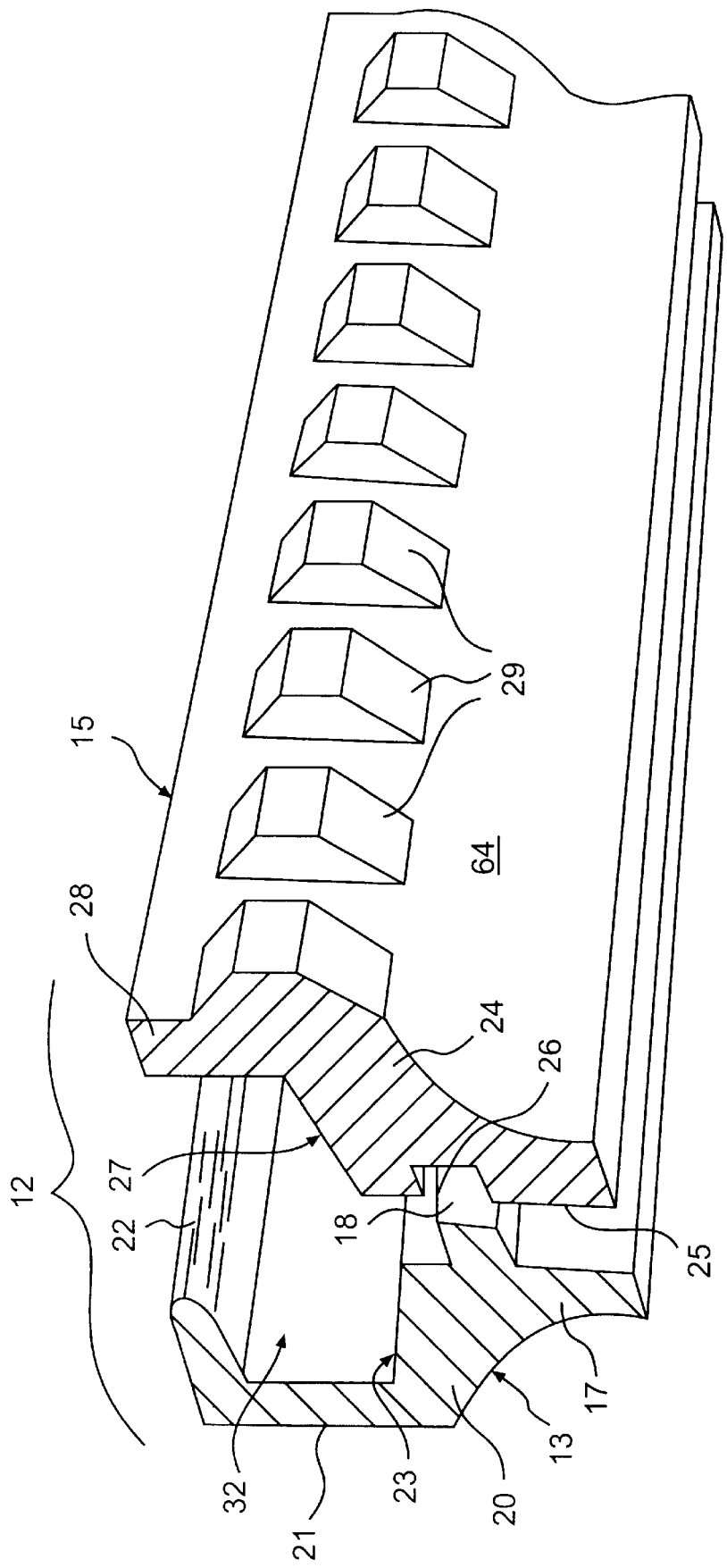
FIG. 2 is an exploded, perspective view of a modified form of a component of FIG. 1.
Figure 3:
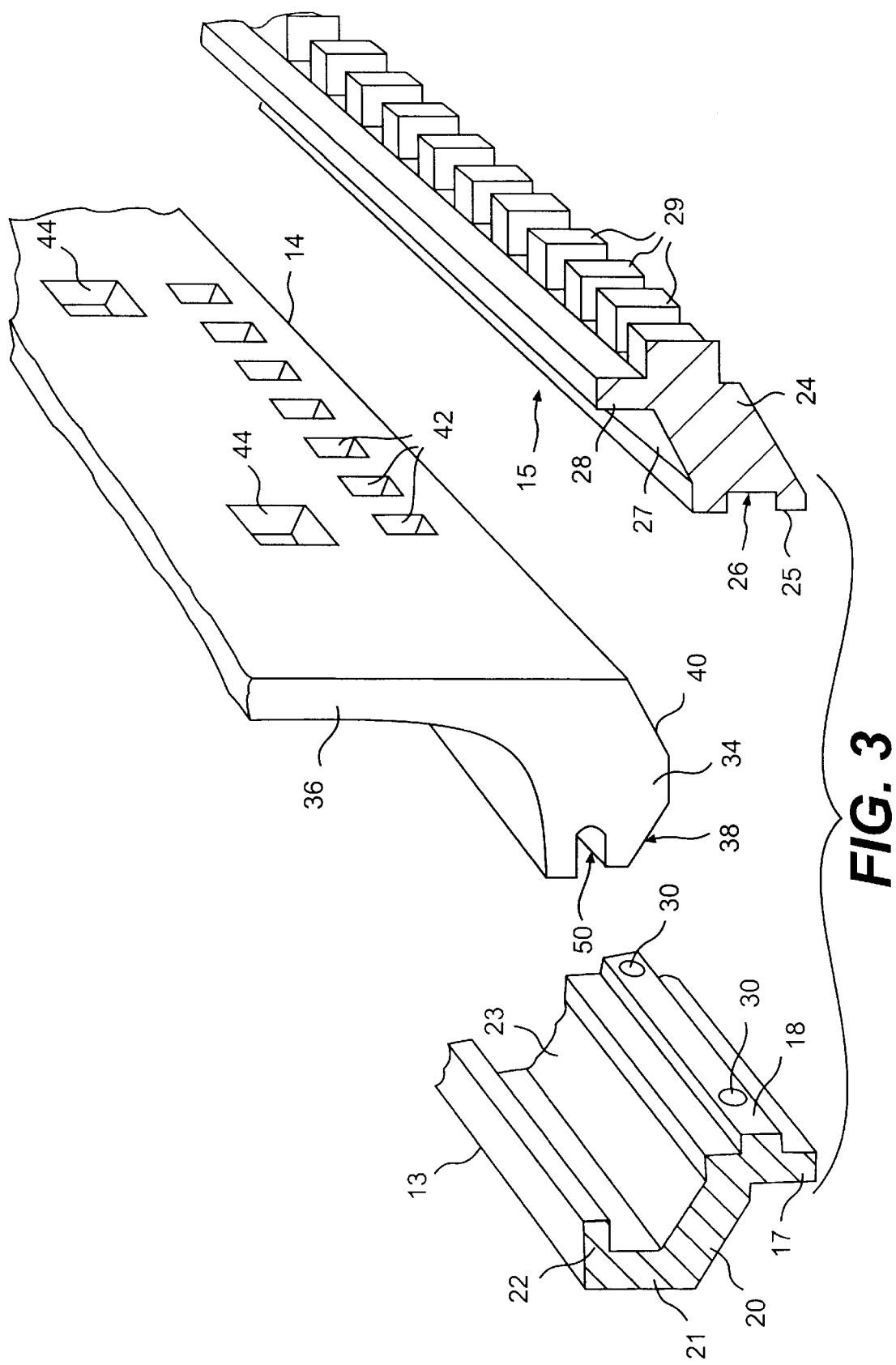
FIG. 3 is an exploded, perspective view of components similar to those of FIG. 1, but incorporating the modification of FIG. 2.

With reference to FIGS. 1 to 3, the mechanism 10 shown therein has an elongate lower rail 12, an elongate upper rail 14 and a locking member 16. The rail 12 supports the rail 14 thereon. Locking member 16 is pivotably mounted on upper rail 14 and is reversibly pivotable on an axis parallel to rails 12, 14, as shown by arrow X, between an engagement position shown in FIG. 1 and a retracted position (shown in broken outline) which is anticlockwise with respect to its position in FIG. 1. Locking member 16 locks rail 14 against movement longitudinally of rail 12 when in its engagement position, but frees rail 14 for such movement when in its retracted position Locking member 16 is movable to its engagement position by suitable means (not shown) for example, resilient biasing means such as a spring.

In FIG. 1, the lower rail 12 is shown as being of integral form However, as shown by the modification of FIG. 2, the rail 12 can comprise two elongate parts 13 and 15 which are formed separately for ease of manufacture, and which are able to be secured in assembly. The parts 13 and 15 of FIG. 2 correspond to a split in the integral form of rail 12 of FIG. 1 shown by the broken line A. The split may be of other forms. However, description now is directed to the form resulting in the modification shown in FIG. 2, with relevant corresponding features of FIG. 1 having the reference numerals used in relation to FIG. 2.

The respective form of parts 13 and 15 of rail 12 are shown most clearly in the exploded perspective view of FIG. 2. Part 13 of FIG. 2 has an inner, upstanding wall 17 which defines a laterally extending, longitudinal rib 18 by which it is engageable with part 15. At the outer side of wall 17, part 13 has a side wall which includes a lower, upwardly and outwardly divergent portion 20 and an upwardly extending upper portion 21. At its upper edge, side wall portion 21 has a rib 22 which extends laterally inwardly in the direction of rib 18, while lower portion 20 defines a bearing surface 23.

Part 15 of lower rail 12 of FIG. 2 has a solid body 24 which, along its inner side 25, defines a laterally open groove 26. Outwardly from side 25, body 24 defines an upwardly and outwardly inclined top bearing surface 27 and, at the outer extent of surface 27, part 15 has an upwardly extending side wall 28. Projecting outwardly beyond wall 28, body 24 is provided with a longitudinal series of laterally projecting teeth 29.

Rail 12, where comprising parts 13 and 15, is formed by joining the parts 13 and 15 together. For this, the inner side of wall 17 is urged against side 25 so as to locate rib 18 in groove 26, with rib 18 being a neat fit in groove 26. The parts 13 and 15 can be secured in this relationship, such as by bonding with an epoxy resin or welding, or by screws or rivets inserted laterally through part 15 so as to engage in holes 30 in rib 18 (see FIG. 3). With parts 13 and 15 secured together, bearing surfaces 23 and 27 are mutually inclined at a similar, opposite angle to a vertical plane through rail 12. Also, rail 12 defines an upwardly open, longitudinal channel 32 of which surfaces 23 and 27 define the base, while side wall portion 21 and wall 28 define the sides of channel 32.

Rail 14 of FIG. 1 is similar to rail 14 of FIG. 3, and has an elongate body 34 and a side plate 36 which extends upwardly from body 34. The bottom surface of body 34 defines two mutually inclined longitudinal bearing surfaces 38 and 40 which are at substantially the same inclination to a vertical plane as surfaces 23 and 27 of rail 12.

Side plate 36 of rail 14 is offset to one side of a central, vertical plane through body 34, such that plate 36 is above bearing surface 40. Over a part of the length of rail 14 which is spaced from each of its ends, the side of body 34 to which plate 36 is offset defines a short series of longitudinally spaced, laterally open pockets or recesses 42. Above the first and last of recesses 42, a respective opening 44 is provided through plate 36. At each side of each opening 44, side plate 36 has a vertical rib 46 on its face remote from recesses 42, with each rib 46 defining a longitudinal groove 48. Also, at the side of body 34 further from plate 36, body 34 defines a longitudinal, laterally open groove 50.

Rail 12, of each form shown in FIGS. 1 to 3, is of substantially uniform cross-section throughout at least a major part of its length, except for the variation in that section resulting from teeth 29. Similarly, in each of FIGS. 1 and 3, rail 14 is of substantially constant cross-section throughout a major part of its length, except for the variation in that section resulting from recesses 42, the openings 44 and the ribs 46.

Rail 14, in each arrangement of FIGS. 1 to 3, is mounted on and movable along rail 12. For this, body 34 is received in channel 32 with its bearing surfaces 38 and 40 opposed to respective bearing surfaces 23 and 27 of rail 12. As shown in FIG. 1, a respective series of bearing rolls 52 is provided between opposed bearing surfaces 23 and 38 and between bearing surfaces 27 and 40. As also shown in FIG. 1, body 34 is retained in channel 32 by rib 22 of rail 12 locating in groove 50 of rail 14. The same can apply in the case of FIG. 3, although the height of rib 22 and of groove 50 can be such that the respective bearing surfaces are in direct sliding contact.

The locking member 16 is of somewhat C-shape in end elevation. Also. it has a longitudinal extent which is short relative to the length of the rails 12 and 14. The length of the locking member 16 corresponds substantially to the longitudinal spacing between openings 44 of plate 36, and to the longitudinal extent of the series of recesses 42 of body 34, of rail 14.

Figure 4:
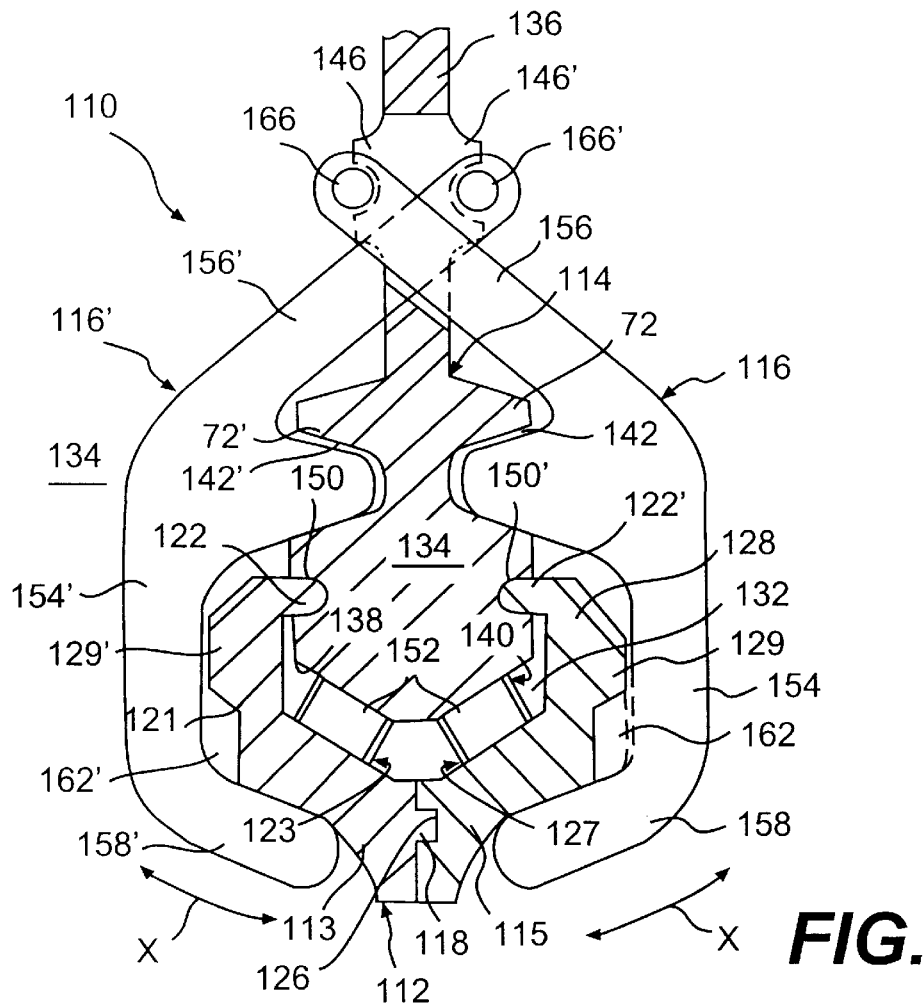
FIG. 4 corresponds to FIG. 1 but shows a second form of the mechanism according to the present invention.
Figure 5:
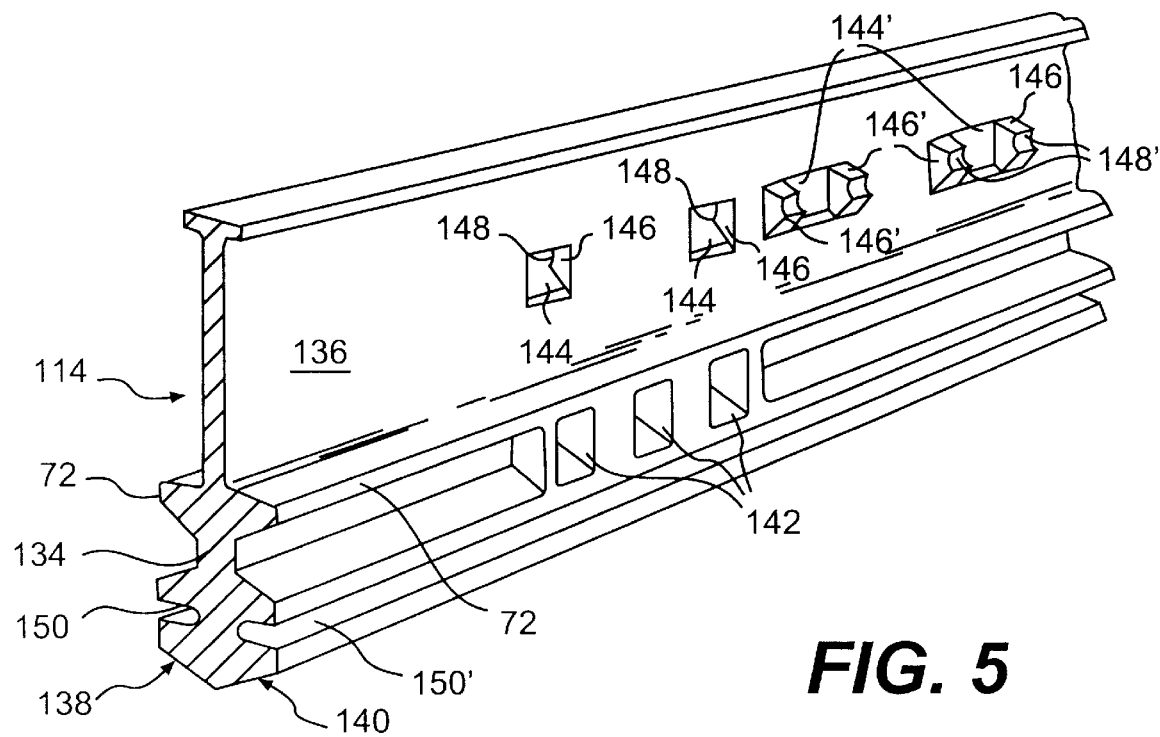
FIG. 5 is a partial side elevation of a component of the mechanism of FIG. 4.
Figure 6:
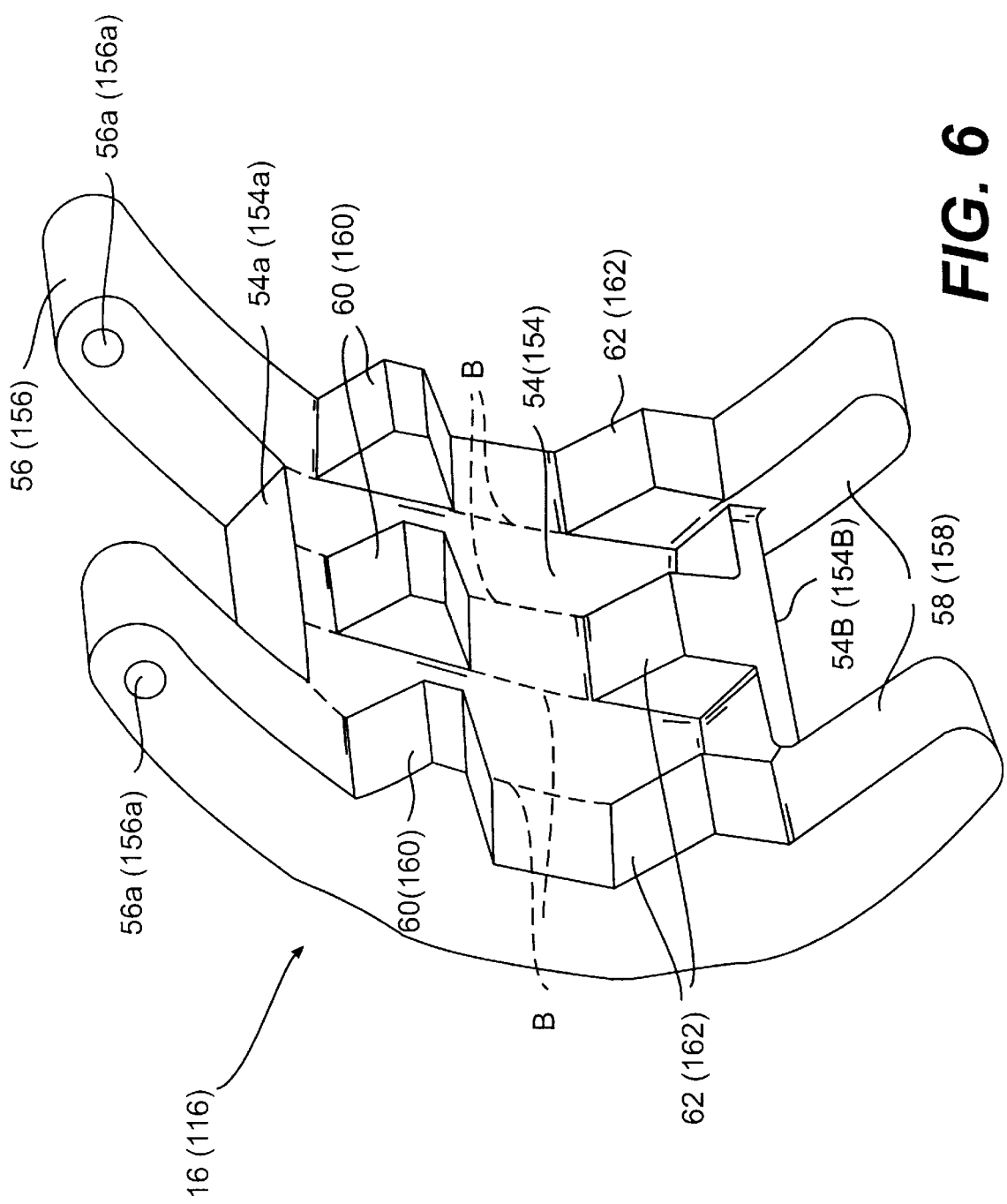
FIG. 6 is a perspective view of a further component of the mechanism of FIG. 4.

Locking member 16, when viewed in perspective, has the general form shown for locking member 116 of FIGS. 4 to 6. Locking member 16 may be of integral form or, as described later herein with reference to FIG. 6, it may be of segmented form and secured in assembly by any suitable means.

Locking member 16 has a somewhat rectangular body 54 which is laterally adjacent to and extends above and below a region along which rail 14 is supported on rail 12. Locking member 16 also has a respective arm 56 projecting from each end of the upper edge 54a of body 54, and a respective leg 58 projecting from each end of the lower edge 54b of body 54. Each arm 56 projects upwardly and inwardly from edge 54a, while each leg 58 extends inwardly, and is slightly inclined downwardly from edge 54b.

A short distance below edge 54a, locking member 16 has an array of three upper teeth 60 which are spaced in the direction of the longitudinal extent of rails 12 and 14. Also, adjacent to edge 54b, locking member 16 has a similar array of lower teeth 62.

Locking member 16 is mounted in relation to rails 12 and 14 as shown in FIG. 1. As is evident from FIG. 1, locking member 16 is arranged such that its body 54 is adjacent to the side of rail 12 along which teeth 29 are disposed and the side of rail 14 at which recesses 42 open. Also, locking member 16 is disposed such that the end of each arm 56 which is remote from body 54 projects from that side of rail 14, through a respective opening 44, to the other side of rail 14. Additionally, each leg 58 of locking member 16 extends below rail 12 such that its end remote from body 54 is opposed laterally to an abutment surface 64 of body 24 of rail 12. The projecting ends of each arm 56 has a pivot pin 66 secured in its bore 56a, with the projecting ends of each pin 66 located in a respective groove 48 of a rib 46 of plate 36. The arrangement is such that locking member 16 is pivotably on a common axis of pins 66 between its engagement position, as shown in solid line in FIG. 1, and a retracted position shown in broken outline in FIG. 1. The teeth 60 and the teeth 62 are spaced in the respective array such that, with locking member 16 in its engagement position, each tooth 60 is received in a respective recess 42 of rail 14 and teeth 62 mesh with selected teeth 29 of rail 12, to thereby restrain rail 14 against movement along rail 12. Locking member 16 moves to its retracted position by pivoting in an anti-clockwise direction as viewed in FIG. 1. In the retracted position, teeth 62 are out of engagement with teeth 29, to enable movement of rail 14 along rail 12, with that retracted position being set, for example, by engagement of each arm 56 with the upper peripheral edge of its opening 44. With locking member 16 in its retracted position, teeth 60 preferably are only partially withdrawn from recesses 42, with co-operation between teeth 60 and recesses 42 serving to guide locking member 16 in its pivotal movement. With rail 14 moved to a new longitudinal location along rail 12, locking member 16 is allowed to return to its engagement position, with teeth 62 meshing with different ones of the series of teeth 29.

Means (not shown) is provided to move locking member 16 to its engagement position. For example, a leaf spring may be mounted on plate 36 of rail 14, above locking member 16, and act resiliently on one or each of arms 56. Alternatively, a leaf spring may be mounted on rail 12, and act on the external surface of at least one of legs 58 of locking member 10. In a further alternative, a coil spring can be mounted between rail 12 and at least one of legs 58. In each case, such spring acts as biasing means which biases the locking member to its locking position.

Rail 12 is adapted to be secured to the substructure, pan or floor of a vehicle, with rail 14 secured to a vehicle seat. The securement of rail 12 can be by any suitable arrangement known in the art, such as a respective bracket or the like at each end thereof.

Rail 14 is adapted for securement to the underside of a vehicle seat at locations along its side plate 36. The securement can be by any suitable means, also well known in the art.

Pivotal movement of locking member 16 can be by any suitable means well known in the art. Thus, there may be a longitudinal release bar which extends along one side of mechanism 10, and which is manually rotatable for pivoting of locking member 16. Such bar may be an extension of one pivot pin 66, or the bar may extend through bores 56a and provide the pivot pin 66 for each arm 56 of locking member 16.

As indicated, the modification of mechanism 10 envisaged by FIG. 2 is the provision of a two part rather than a unitary rail 12. FIG. 3 shows a similar modification but in other respects is the same as FIG. 1, apart from the square form of rib 22 and the configuration of teeth 29. In mechanism 10 of FIG. 1, and with the modifications of one or each of FIGS. 2 and 3, locking member 16 when in its engagement position serves a function additional to that of preventing movement of rail 14 along rail 12. Specifically, locking member 16 restrains rail 14 from lifting away from rail 12. This further function also is served at one side of rails 12 and 14 by engagement of rib 22 of rail 12 in groove 50 of rail 14, although locking member 16 significantly enhances this engagement at the other side of rails 12 and 14 at least when locking member 16 is in its engagement position.

As shown in FIG. 1, in which locking member 16 is in its engagement position, each tooth 60 of locking member 16 is located in a respective recess 42 of rail 14 such that a lower surface of the tooth 60 bears down on the lower peripheral surface of its recess 42. Also, the upper surface of each leg 58 of locking member 16 bears upwardly against a downwardly facing abutment portion of surface 64 of rail 12. Thus, rails 12 and 14 are held in their required relationship, between and by the action of teeth 60 and legs 58. Indeed, even with locking member 16 in its retracted position, shown in broken outline in FIG. 1, this relationship is substantially retained by virtue of the pivotable mounting of locking member 16 on plate 36 of rail 14 and the close location of legs 58 below the lower extent of teeth 29 of rail 12.

The arrangement of the second mechanism of FIGS. 4 to 6 is similar to those of FIGS. 1 to 3 and will be readily understood. Corresponding components have the same reference numerals plus 100, and description is limited to matters of difference.

There in fact are several differences in the mechanism 110 of FIGS. 4 to 6. These principally reside in the form of each of rails 112 and 114 and the provision of a respective locking member 116 and 116' on each side of rails 112 and 114. Moreover, as is evident from FIGS. 4 and 5, rail 114 is of substantially symmetrical form. Also, as is shown in FIG. 4, rail 112 is an assembly of parts 113 and 115 but, overall, is substantially symmetrical.

The parts 113 and 115 are inter-related and joined together as described for rail 12 of FIG. 2. However, part 115 has a side wall 128 with a laterally, inwardly extending rib 122', similar to wall 121 and rib 122 of part 113. Also, part 113 has teeth 129', corresponding to teeth 129 of part 115 but projecting in the opposite lateral direction.

The body 134 of rail 114 has a respective laterally open groove 150 and 150' along each of its opposite sides. Rail 114 is supported in channel 132 of rail 112 in a similar manner to the corresponding rails of FIG. 1. However, each of grooves 150 and 150' receives a respective one of ribs 122 and 122' of rail 112, to restrain rail 114 from lifting from rail 112.

For each of the locking members 116 and 116', the plate 136 of rail 114 has a respective set of recesses 142 and 142' and a respect pair of openings 144 and 144'. The locking members 116 and 116' are partially longitudinally offset, to accommodate location of their arms 156 and 156' in respective pairs of openings 144 and 144'. Also, plate 136 of rail 114 has, adjacent at least one opening 144 and 144' of each pair, a respective pair of ribs 146 and 146' each provided with a groove 148 and 148'. As shown most clearly in FIG. 5, recesses 142 and 142' (142' not visible in FIG. 5) of each set are defined between body 134 and a respective rib 72 and 72' of rail 114.

FIG. 6 shows locking member 116, although locking member 116' is identical and merely reversed end for end. Locking member 116 is shown as being of integral form, having a solid body 154, 154' a pair of arms 156, 156' and a pair of legs 158, 158' with a set of upper teeth 160, 160' engageable respectively in recesses 142, 142' of rail 114, and a set of lower teeth 162, 162' for meshing with teeth 129, 129' of rail 112. The corresponding parts of locking member 116' are correspondingly designated where visible.

It is noted that in FIG. 6, reference numeral 156a is a bore, 154a is an edge, and 154b is an edge. Furthermore, in FIG. 4, reference numeral 118 is a longitudinal rib, 123 and 127 are bearing surfaces, 126 is a groove, 138 and 140 are bearing surfaces, and 152 are bearing rolls.

Operation of the mechanism 110 of FIGS. 4 to 6 is similar to that of the previously described mechanisms. As will be appreciated, each of the locking members 116 and 116', when in its engagement position as shown in FIG. 4 restrains rail 114 against movement along rail 112. Also, each of the locking members 116 and 116' needs to be moved to its retracted position, by opposite pivotal movement, to free rail 114 for such movement. The locking members 116 and 116' may be moved to their engagement positions by suitable means for example, resilient biasing means acting between them, or by a respective biasing means for each of the locking members 116 and 116'.

The provision of the two locking members 116 and 116' provides for added safety, such as in the event of extreme side loadings as can occur when a vehicle suffers a severe side collision. In the event of resultant side forces twisting the vehicle body and acting to displace one of locking members 116 and 116', the same forces also will act to retain the other locking member in its engagement position.

Simultaneous movement of each of the locking members 116 and 116' can be arranged in a variety of ways. In one convenient arrangement for this, a first of the locking members is pivotable under the action of a manually operable release bar coupled with it, with the first locking member coupled to the second locking member by means of a flexible cable which passes from the first, and beyond the second locking member, and returns to the latter after passing around a pulley mounted on a fixture of the vehicle.

In mechanism 110, rail 114 is restrained from lifting off rail 112 by location of ribs 122 and 122' of rail 112 in respective grooves 150 and 150' of rail 114. However, in the manner described for mechanism 10 of FIG. 1, each of the locking members 116 and 116' supplements and enhances this restraint. This applies at least while the locking members are in their respective engagement positions, but preferably also when in their respective retracted position.

Also, in mechanism 110, locking member 116 is shown as being of integral form, with the same applying to locking member 116'. However, if required, these locking members could be made in a segmented form, with segments shown by broken lines B, and by securing the segments in assembly by any suitable means.

It will be appreciated that, with each mechanism 10 and 110 shown in the drawings, a laterally spaced, parallel pair of the mecnanisms is used to provide mounting for a seat to enable adjustment of the seat in the fore and aft directions. Where each mechanism of the pair has a single locking member, a single actuator may provide for pivoting of both locking members in unison to their retracted positions. Alternatively, the actuator may act directly on only one of the locking members, with the other pivoting in unison with and in response to pivoting of the one locking member by means of a link, coupling or cable between the locking members. Where each mechanism has two locking members, the actuator usually will act directly on one locking member of each pair, or directly on one locking member of one of the mechanisms, with the other locking members pivoting in response to pivoting of the or each locking member on which the actuator acts. Of course, it is possible for one mechanism to have two locking members, and the other to have only one locking member.

In each mechanism 10 (and 110) illustrated in the drawings, the rails 12 (112) and 14 (114), and locking members 16 (116, 116') and their parts where made separately, preferably are cast from a light weight metal by pressure diecasting, most preferably of a magnesium or aluminium alloy, or a respective such alloy for different components. However, they can be diecast from zinc alloy, while casting other than diecasting and use of other metals is possible. Also, one or more of the components can be injection molded from an engineering plastics material, such as nylon or PTFE, or cast or moulded from a metal matrix composite material or made by a suitable powder metallurgy process. Particularly where diecast, and of a magnesium and/or aluminum alloy, the mechanisms 10 (and 110') have a high integral load bearing capacity, as well as a relatively high strength to weight ratio.

The locking member 16 (or locking members 116 and 116') lock with each of rails 12 and 14 (or 112 and 114) and this reduces loading at the site of their pivot pin or pins 66 (or 166 and 166'). This double locking arrangement thus adds to safety in minimising risk of failure in the event of a front or rear end collision. Also, the extension of the locking members 16 (or 116 and 116') around the rails 12 and 14 (or 112 and 114) safeguard against their displacement in the event of a side impact.

In each of the mechanisms 10 (or 110) illustrated in the drawings, the locking member 16 (or 116 and 116') engages with teeth 29 (or 129 and 129') or recesses between these teeth of a longitudinal series thereof along the fixed rail 12 (or 112). The series of teeth may extend along the full length of the rail. However, the series need only extend along a rail to an extent consistent with the full range of movement of rail 14 (or 114) along rail 12 (or 112), over that part of the length of rail 12 (or 112) traversed by the locking member or locking members in such range.

In each of the mechanisms illustrated in the drawings, the or each locking member is pivotable on the movable rail, and locks with the fixed rail. However, it is to be appreciated that a converse arrangement is possible, with the or each locking member pivotable on the fixed rail 12 (or 112) and able to lock with the movable rail 14 (or 114).

In each of the mechanisms shown in the drawings, the fixed rail and the movable rail usually will have a length which is a major part of the fore to aft dimension of a vehicle seat with which they are to be used. That dimension frequently is about 400 mm. The rails may be of a similar length, while a usual range of fore and aft adjustment required for a vehicle seat is about 250 mm. The locking member or locking members can be provided at any suitable location along the rails, but it usually is convenient for access to an actuator to have the locking member or locking members at the forward half of the rails.

The dimensions of the or each locking member can vary substantially. However, as is evident from the drawings, its height may be similar to its length longitudinally of the rails. Also, that length is a minor part of the length of the rails, and may for example be from about 40 to 80 mm. The longitudinal extent of the array of teeth, projections, recesses or the like, such as teeth 29 of FIGS. 1 to 3, and of teeth 29 (129 and 129') in FIGS. 4 to 6, with which the locking member or each locking member engages to prevent movement of the movable rail along the fixed rail, need not extend along the full longitudinal extent of the fixed rail. The same applies when the locking member or each locking member is pivotably mounted on the fixed rail and the teeth projections, recesses or the like are defined by the movable rail. In each case, it is sufficient if the extent of the array of teeth, projections, recesses or the like along the relevant rail is about equal to the sum of the length of the locking member longitudinally of the rails plus the extent to which the movable rail is to be adjustable along the fixed rail.

As will be appreciated from the preceding description, and the illustrated embodiments, the mechanism of the invention has numerous advantages. The track components are amenable to manufacture in an inter-locking form. The locking member component itself enhances inter-locking of the rails and, at least to this extent, can proceed substantially beyond merely providing a component which, as with the conventional locking member, only locks the tracks in a chosen longitudinal relationship. The track components can be of a unique form which provides for self-alignment and, as a consequence, both increased resistance to side impact forces and wider manufacturing tolerances.

The mechanism also is amenable to integration of additional components that normally are assembled on to tracks, such as track mounting feet, mounting points for height adjustment, a recliner facility and seat belt anchor points. Moreover, while components of the mechanism can be produced from steel fabrications or the like, they also are suitable for pressure diecasting from alloys of magnesium, aluminium or zinc, or molding from engineering plastics material. Thus, the mechanism can be of relatively light weight, but have an enhanced strength to weight ratio. Also, where cast or molded, the components can require little or no subsequent machining or other finishing.

The interlocking arrangement possible for the tracks and the locking member (or locking members) can significantly enhance safety, in particular can provide improved crash performance. Moreover, this can be achieved with a saving in weight and with a reduced number of distinct component forms.

The invention is able to be modified in a number of respects, without departing from the spirit of the present disclosure. Thus, for example, the relationship between the locking member or locking members and the fixed track can be modified to enhance both retention of that relationship and overall safety. In each of the illustrated embodiments, there is, for example, a close spacing between the bottom of the fixed track and the locking member(s). However, given that the or each locking member is pivotable about an axis that may be, and preferably is, parallel to the tracks, the bottom of the fixed track and the adjacent part of the locking member can have a respective arcuate surface which has a center of curvature at that axis, with the respective arcuate surfaces in sliding contact.

Finally, it is to be understood that various alterations, modifications and/or additions may be introduced into the constructions and arrangements of parts previously described without departing from the spirit or ambit of the invention.

What is claimed is:

1. A seat mounting mechanism for mounting a seat for adjustable fore and aft movement, the mechanism comprising:

an elongate fixed rail securable to a substructure, pan or floor;

an elongate movable rail engageable with the fixed rail and securable to a seat;

at least one locking member mounted on one of the fixed and movable rails and pivotable between an engagement position for locking the movable rail relative to the fixed rail and a retracted position for freeing the movable rail for adjustment along the fixed rail, wherein, the locking member is mounted for movement about a pivot axis extending substantially parallel to the fixed and movable rails;

the at least one locking member has engagement means selectively engageable with engagement means disposed along the other of the fixed and movable rails; and the at least one locking member includes inter-fitting means located intermediate the pivot axis and the engagement means of the at least one locking member, said inter-fitting means is inter-fit with inter-fitting means formed on said one of the fixed and movable rails at least when the locking member is in the engagement position and said inter-fitting means of the locking member is at least Partially withdrawn from said inter-fit with said inter-fitting means formed on said one of the fixed and movable rails as said at least one locking member is pivoted from said engagement position to said retracted position.

2. The mechanism of claim 1, wherein the movable rail is an upper rail supported on the fixed rail; and wherein the locking member extends from the pivot axis to one side of the rails and across a region where the movable rail is supported on the fixed rail, to a region where the engagement means of the locking member is engageable with the engagement means on the other of the fixed and movable rails.

3. The mechanism of claim 1, wherein the engagement means of the locking member comprises a plurality of lateral projections and the engagement means of the second rails comprises a series of laterally open recesses defined along the second rail.

4. The mechanism of claim 1, wherein the engagement means of the locking member comprises a plurality of laterally open recesses and the engagement means of the other of the fixed and movable rails comprises a series of lateral projections defined therealong.

5. The mechanism of claim 1, wherein the locking member is mounted on the movable rail and the engagement means of the locking member comprises lateral projections; the engagement means of the other of the rails comprises a series of laterally open recesses defined along the fixed rail; and said lateral projections are received in selected ones of the laterally open recesses when the locking member is in the engagement position.

6. The mechanism of claim 1, wherein the locking member is mounted on the movable rail and the engagement means of the locking member comprises a series of laterally open recesses; the engagement means of the other of the rails comprises a series of lateral projections formed along the fixed rail; and said laterally open recesses receive selected ones of said lateral projections when the locking member is in the engagement position.

7. The mechanism of claim 1, wherein said inter-fitting means of the locking member has at least one abutment surface which, at least when the locking member is in its engagement position, abuts against at least one abutment surface of said one of the fixed and movable rails, whereby the rails are restrained from separating from engagement with each other by combined action of abutment of said respective at least one abutment surfaces and engagement between the respective engagement means.

8. The mechanism of claim 1, wherein the respective interfitting means each comprises a plurality of lateral projections with the projections of the locking member meshing with the projections of said one of the fixed and movable rails.

9. The mechanism of claim 1, wherein the interfitting means of the locking member comprises a plurality of teeth and the interfitting means of said one of the fixed and movable rails comprises a plurality of laterally open recesses for receiving respective teeth of said plurality of teeth.

10. The mechanism of claim 1, wherein the locking member has at least two arms projecting from a main body portion, said main body portion is located on a first side of the rails, said at least two arms extend through said one of the fixed and movable rails, said locking member is pivotally mounted on said one of the fixed and movable rails at a second side of said one of the first and movable rails, opposite the first side.

11. The mechanism of claim 10, wherein the locking member as viewed in a longitudinal direction of the rails is of C-shaped configuration, the locking member having a portion remote from said arms extending across an edge of the other of the fixed and movable rails and terminating adjacent to the first side of the other of the fixed and movable rails when in the engagement position.

12. The mechanism of claim 1, wherein the locking member is of integral or unitary construction.

13. The mechanism of claim 1, wherein the locking member is formed of a plurality of parts secured together at adjacent surfaces extending laterally with respect to the rails.

14. The mechanism of claim 1, wherein the locking member is cast from a group of light metal alloys consisting of aluminum, magnesium and zinc alloy.

15. The mechanism of claim 1, wherein the locking member is molded from plastic.

16. The mechanism of claim 1, wherein the movable rail is of integral or unitary form and is molded from plastic.

17. The mechanism of claim 1, wherein the fixed rail defines an upwardly facing, longitudinal surface on which the movable rail is supported, and the movable rail has a downwardly facing bearing surface for being supported on the fixed rail for movement therealong.

18. The mechanism of claim 17, wherein the rails are in direct, sliding contact at the respective bearing surfaces.

19. The mechanism of claim 17, wherein bearing means are provided between the respective surfaces.

20. The mechanism of claim 17, wherein the bearing surface of the fixed rail has the form of a V-section trough, and the bearing surface of the movable rail is of complementary form to the bearing surface of the fixed rail.

21. The mechanism of claim 1, wherein the fixed rail has at least one upstanding, longitudinal side wall laterally adjacent to a lower portion of the movable rail, and wherein a laterally extending rib on the side wall is located in a longitudinal slot defined by said lower portion to prevent the movable rail from lifting from the fixed rail.

22. The mechanism of claim 1, wherein the movable rail is of integral or unitary form and is cast from a group of light alloys consisting of aluminum, magnesium and zinc alloy.

23. The mechanism of claim 1, wherein the movable rail has a lower, longitudinal body portion for being mounted on the fixed rail and an upwardly extending longitudinal plate and said plate is securable to a seat.

24. The mechanism of claim 1, wherein the fixed rail is cast from a group of light alloys consisting of aluminum, magnesium and zinc alloy.

25. The mechanism of claim 1, wherein the fixed rail is of integral or unitary form.

26. The mechanism of claim 24, wherein the fixed rail comprises at least two longitudinal parts securable together as an assembly.

27. The mechanism of claim 1, wherein the fixed rail is molded from plastic.

28. A seat mounting mechanism for mounting a seat for adjustable fore and aft movement, the mechanism comprising:

an elongate fixed rail securable to a substructure, pan or floor;

an elongate movable rail engageable with the fixed rail and securable to a seat;

two locking members each mounted on one of the fixed and movable rails and pivotable between an engagement position for locking the movable rail relative to the fixed rail and a retracted position for freeing the movable rail for adjustment along the fixed rail, wherein each locking member is mounted for movement about a respective pivot axis extending substantially parallel to the fixed and movable rails;

each locking member has engagement means selectively engageable with respective engagement means disposed along the other of the fixed and movable rails; and each locking member includes inter-fitting means located intermediate the respective pivot axis and the respective engagement means of the locking member, said inter-fitting means of each locking member is inter-fit with respective inter-fitting means formed on said one of the fixed and movable rails at least when the locking member is in the engagement position and said inter-fitting means of the locking member is at least partially withdrawn from said inter-fit with said respective inter-fitting means formed on said one of the fixed and movable rails as said one locking member is pivoted from said engagement position to said retracted position;

wherein said locking members are in an opposed relationship with the rails extending therebetween and are oppositely pivotable between said engagement and retracted positions.

29. A seat mounting mechanism for mounting a seat for adjustable fore and aft movement, the mechanism comprising:

an elongate fixed rail securable to a substructure, pan or floor;

an elongate movable rail engageable with the fixed rail and securable to a seat;

at least one locking member mounted on the movable rail and pivotable between an engagement position for locking the movable rail relative to the fixed rail and a retracted position for freeing the movable rail for adjustment along the fixed rail, wherein the locking member is mounted for movement about a pivot axis extending substantially parallel to the fixed and movable rails;

the at least one locking member has engagement means selectively engageable with engagement means disposed along the fixed rail; and said at least one locking member includes inter-fitting means located intermediate the pivot axis and the engagement means of the at least one locking member, said inter-fitting means is inter-fit with inter-fitting means formed on the movable rail at least when the locking member is in the engagement position and said inter-fitting means of the locking member is at least partially withdrawn from said inter-fit with said inter-fitting means formed on said one of the movable rails as said at least one locking member is pivoted from said engagement position to said retracted position.

30. The mechanism of claim 29, wherein the locking member has at least two arms projecting from a main body portion, said main body portion is located on a first side of the rails, said at least two arms extend through the movable rail, said locking member is pivotably mounted on the movable rail at a second side of the movable rail, opposite the first side.

31. The mechanism of claim 30, wherein the locking member as viewed in a longitudinal direction of the rails is of C-shaped configuration, the locking member having a portion remote from said arms extending across an edge of said movable rail and terminating adjacent to the first side of the fixed rail when in the engagement position.

* * * * *